United States Patent
Akiike

(10) Patent No.: US 10,637,063 B2
(45) Date of Patent: Apr. 28, 2020

(54) BINDER COMPOSITION FOR NON-AQUEOUS SECONDARY BATTERY POROUS MEMBRANE, SLURRY COMPOSITION FOR NON-AQUEOUS SECONDARY BATTERY POROUS MEMBRANE, POROUS MEMBRANE FOR NON-AQUEOUS SECONDARY BATTERY, AND NON-AQUEOUS SECONDARY BATTERY

(71) Applicant: ZEON CORPORATION, Chiyoda-ku, Tokyo (JP)

(72) Inventor: Junnosuke Akiike, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 7 days.

(21) Appl. No.: 16/062,203

(22) PCT Filed: Dec. 15, 2016

(86) PCT No.: PCT/JP2016/005146
§ 371 (c)(1),
(2) Date: Jun. 14, 2018

(87) PCT Pub. No.: WO2017/110067
PCT Pub. Date: Jun. 29, 2017

(65) Prior Publication Data
US 2018/0375099 A1 Dec. 27, 2018

(30) Foreign Application Priority Data

Dec. 25, 2015 (JP) .................. 2015-255344

(51) Int. Cl.
| | | |
|---|---|---|
| *H01M 4/62* | (2006.01) | |
| *C08J 9/28* | (2006.01) | |
| *H01M 4/66* | (2006.01) | |
| *H01M 2/14* | (2006.01) | |
| *H01M 2/16* | (2006.01) | |
| *C08L 55/02* | (2006.01) | |
| *C08L 9/02* | (2006.01) | |
| *C01B 32/158* | (2017.01) | |
| *C01B 32/182* | (2017.01) | |
| *H01M 4/38* | (2006.01) | |
| *H01M 2/02* | (2006.01) | |

(52) U.S. Cl.
CPC .......... *H01M 4/622* (2013.01); *C01B 32/158* (2017.08); *C01B 32/182* (2017.08); *C08J 9/28* (2013.01); *C08L 9/02* (2013.01); *C08L 55/02* (2013.01); *H01M 2/145* (2013.01); *H01M 2/166* (2013.01); *H01M 2/1653* (2013.01); *H01M 2/1686* (2013.01); *H01M 4/382* (2013.01); *H01M 4/621* (2013.01); *H01M 4/666* (2013.01); *C01P 2004/64* (2013.01); *C08J 2201/0502* (2013.01); *C08J 2207/00* (2013.01); *C08J 2309/02* (2013.01); *H01M 2/0295* (2013.01); *H01M 2/168* (2013.01)

(58) Field of Classification Search
CPC .. H01M 4/622; H01M 4/1653; H01M 4/1686; H01M 4/382; H01M 2/166; H01M 2/1666; H01M 2/1673; C08L 55/02; C08L 9/02; C01P 2004/64; C01B 32/158; C01B 32/182
USPC ........................................................ 429/217
See application file for complete search history.

(56) References Cited

U.S. PATENT DOCUMENTS

| | | | | |
|---|---|---|---|---|
| 2010/0285371 A1* | 11/2010 | Lee | ........................ | H01M 2/145 429/247 |
| 2012/0258350 A1* | 10/2012 | Fukui | .................... | H01M 2/145 429/144 |
| 2013/0244080 A1* | 9/2013 | Song | ..................... | H01M 2/166 429/144 |
| 2013/0266873 A1 | 10/2013 | Ishii et al. | | |
| 2013/0273421 A1* | 10/2013 | Matsumura | ............. | H01M 4/13 429/211 |
| 2014/0023922 A1 | 1/2014 | Isshiki et al. | | |
| 2015/0357648 A1 | 12/2015 | Sugimoto et al. | | |
| 2015/0380705 A1* | 12/2015 | Lee | ..................... | H01M 2/1653 429/246 |

FOREIGN PATENT DOCUMENTS

| | | | |
|---|---|---|---|
| JP | 2009518808 A | 5/2009 | |
| JP | 2013145763 A | 7/2013 | |
| WO | 2007066966 A1 | 6/2007 | |
| WO | 2012057324 A1 | 5/2012 | |
| WO | 2012099264 A1 | 7/2012 | |

(Continued)

OTHER PUBLICATIONS

Machine translation of WO 2013/147006 (no date).*
Apr. 30, 2019, the Extended European Search Report issued by the European Patent Office in the corresponding European Patent Application No. 16877972.6.
Anonymous, Poly(vinylidene fluoride), Jan. 1, 2015, XP055582314, Retrieved from the Internet, from URL: https://polymerdatabase.com/polymers/polyvinylidenefluoride.html, retrieved on Apr. 18, 2019.
Anonymous, Poly(chlorotrifluoroethylene), Jan. 1, 2015, XP055582317, Retrieved from the Internet, from URL: https://polymerdatabase.com/polymers/Polychlorotrifluoroethylene.html, retrieved on Apr. 18, 2019.

(Continued)

*Primary Examiner* — Amanda C. Walke
(74) *Attorney, Agent, or Firm* — Kenja IP Law PC

(57) ABSTRACT

A binder composition for a non-aqueous secondary battery porous membrane comprises: a polymer; and an organic solvent, wherein a boiling point of the organic solvent is 30° C. or more and 100° C. or less, and an absolute difference $|SP_{diff}|=|SP_p-SP_s|$ between a solubility parameter $SP_p$ of the polymer and a solubility parameter $SP_s$ of the organic solvent is 1.5 or more and 6.0 or less.

7 Claims, No Drawings

(56) References Cited

FOREIGN PATENT DOCUMENTS

WO     WO-2013147006 A1 * 10/2013

OTHER PUBLICATIONS

Jun. 26, 2018, International Preliminary Report on Patentability issued in the International Patent Application No. PCT/JP2016/005146.
Feb. 28, 2017, International Search Report issued in the International Patent Application No. PCT/JP2016/005146.
Robert F. Fedors, A Method for Estimating Both the Solubility Parameters and Molar Volumes of Liquids, Polymer Engineering and Science, Feb. 1974, pp. 147-154, vol. 14, No. 2.

* cited by examiner

BINDER COMPOSITION FOR NON-AQUEOUS SECONDARY BATTERY POROUS MEMBRANE, SLURRY COMPOSITION FOR NON-AQUEOUS SECONDARY BATTERY POROUS MEMBRANE, POROUS MEMBRANE FOR NON-AQUEOUS SECONDARY BATTERY, AND NON-AQUEOUS SECONDARY BATTERY

TECHNICAL FIELD

The present disclosure relates to a binder composition for a non-aqueous secondary battery porous membrane, a slurry composition for a non-aqueous secondary battery porous membrane, a porous membrane for a non-aqueous secondary battery, and a non-aqueous secondary battery.

BACKGROUND

Non-aqueous secondary batteries (hereinafter, also abbreviated as "secondary batteries") such as lithium ion secondary batteries have characteristics such as compact size, light weight, high energy density, and rechargeability, and are used in a wide variety of applications. A secondary battery normally includes battery components such as a positive electrode, a negative electrode, and a separator that separates the positive electrode and the negative electrode, and prevents short-circuiting between the positive electrode and the negative electrode. In some secondary batteries, porous membranes are provided on these battery components as protective layers with an objective such as improving heat resistance and strength.

A porous membrane such as described above can for example be formed by non-conductive particles, such as organic particles or inorganic particles, bound by a binder. The porous membrane is typically formed by preparing a slurry composition (hereinafter, also referred to as "slurry composition for a porous membrane") containing porous membrane materials, such as the non-conductive particles and the binder, that are dissolved or dispersed in a dispersion medium, such as water, applying the slurry composition for a porous membrane onto a substrate, such as an electrode or a separator, and drying the applied slurry composition for a porous membrane.

In recent years, there has been a large amount of activity directed toward improving porous membranes and in particular binders used in porous membranes, with an objective of providing secondary batteries having even higher performance. For example, WO 2012/057324 A1 (PTL 1) proposes a technique of forming a porous membrane using a binder wherein the binder is composed of a polymer containing, in the same molecule, a nitrile group, a hydrophilic group, and a straight chain alkylene structural unit having a carbon number of 4 or more, the content proportion of the nitrile group in the polymer constituting the binder is 1 mass % to 25 mass %, and the iodine value of the polymer is 0 mg/100 mg or more and 30 mg/100 mg or less. The porous membrane in PTL 1 is reported to have excellent heat resistance, flexibility, and adhesiveness and contribute to improved cycle characteristics of a battery.

CITATION LIST

Patent Literature

PTL 1: WO 2012/057324 A1

SUMMARY

Technical Problem

In a secondary battery production process, the battery components and the porous membrane before immersion in an electrolysis solution are cut to respective desired sizes in some cases. Here, if the adhesiveness of the binder included in the porous membrane is insufficient, there is a possibility that the particulate matter constituting the porous membrane comes off the porous membrane (hereinafter, also referred to as "dusting"). This may cause a decrease in battery performance in a subsequent battery operation environment. The porous membrane is therefore required to resist dusting, i.e. required to have high dusting resistance. In other cases, the battery components and the porous membrane before immersion in an electrolysis solution are stacked to yield a laminate, and the laminate is cut to a desired size as necessary, or transported as it is. Such a laminate is required to have high adhesiveness between the battery components and the porous membrane. If the adhesiveness is insufficient, misalignment may occur between the stacked battery components and porous membrane during cutting or transportation, causing problems such as a failure or lower productivity. Hence, the porous membrane needs to have high adhesiveness between the battery components during the battery production process (hereinafter, also referred to as "process adhesiveness"), in addition to the above-mentioned high dusting resistance.

It could therefore be helpful to provide a binder composition for a non-aqueous secondary battery porous membrane capable of forming a porous membrane that has excellent dusting resistance and process adhesiveness and can improve the battery characteristics such as high-temperature cycle characteristics and low-temperature output characteristics of a secondary battery.

It could also be helpful to provide a slurry composition for a non-aqueous secondary battery porous membrane capable of forming a porous membrane that has excellent dusting resistance and process adhesiveness and can improve the battery characteristics of a secondary battery.

It could also be helpful to provide a porous membrane for a non-aqueous secondary battery that has excellent dusting resistance and process adhesiveness and can improve the battery characteristics of a secondary battery.

It could further be helpful to provide a non-aqueous secondary battery having excellent battery characteristics such as high-temperature cycle characteristics and low-temperature output characteristics.

Solution to Problem

Through extensive studies to solve the problems stated above, the inventor discovered that, by using an organic solvent with a boiling point in a specific temperature range and facilitating polymer precipitation in the formation of the porous membrane, the dusting resistance and process adhesiveness of the porous membrane can be improved, and the battery characteristics of a secondary battery including the porous membrane can be improved.

To advantageously solve the problems stated above, a presently disclosed binder composition for a non-aqueous secondary battery porous membrane is a binder composition for a non-aqueous secondary battery porous membrane comprising: a polymer; and an organic solvent, wherein a boiling point of the organic solvent is 30° C. or more and 100° C. or less, and an absolute difference $|SP_{diff}|=|SP_p-SP_s|$ between a solubility parameter $SP_p$ of the polymer and a solubility parameter $SP_s$ of the organic solvent is 1.5 or more and 6.0 or less. The binder composition containing the organic solvent whose boiling point is in the specific temperature range and the polymer whose absolute difference in solubility parameter from the organic solvent is in the specific range is capable of forming a porous membrane that has excellent dusting resistance and process adhesiveness and can improve the battery characteristics such as high-temperature cycle characteristics and low-temperature output characteristics of a secondary battery.

Preferably, in the presently disclosed binder composition for a non-aqueous secondary battery porous membrane, the polymer contains a nitrile group and a straight chain alkylene structural unit having a carbon number of 4 or more, in a same molecule. By using the polymer of such a specific structure, the dusting resistance and process adhesiveness of the porous membrane can be further improved, and the battery characteristics of the secondary battery including the porous membrane can be further improved.

Preferably, in the presently disclosed binder composition for a non-aqueous secondary battery porous membrane, a content proportion of a nitrile group in the polymer is 5 mass % or more and 40 mass % or less. By limiting the content proportion of the nitrile group in the polymer to the predetermined range in this way, the dusting resistance and process adhesiveness of the porous membrane can be further improved.

In the present disclosure, the content proportion of the nitrile group in the polymer can be calculated by the method described in the EXAMPLES section.

Preferably, in the presently disclosed binder composition for a non-aqueous secondary battery porous membrane, a weight-average molecular weight of the polymer is 50,000 or more and 500,000 or less. By using the polymer whose weight-average molecular weight is in the specific range, the process adhesiveness of the porous membrane can be further improved.

In the present disclosure, the weight-average molecular weight of the polymer can be measured using gel permeation chromatography.

Preferably, in the presently disclosed binder composition for a non-aqueous secondary battery porous membrane, the organic solvent is acetone. With the binder composition containing acetone as the organic solvent, the process adhesiveness of the porous membrane can be further improved.

To advantageously solve the problems stated above, a presently disclosed slurry composition for a non-aqueous secondary battery porous membrane comprises: the binder composition described above; and non-conductive particles. Such a slurry composition is capable of forming a porous membrane that has excellent dusting resistance and process adhesiveness and can improve the battery characteristics of a secondary battery.

Preferably, in the presently disclosed slurry composition for a non-aqueous secondary battery porous membrane, a content proportion of the polymer is 15 parts by mass or more and 30 parts by mass or less relative to 100 parts by mass of the non-conductive particles. By limiting the content proportion of the polymer to the non-conductive particles to this specific range, the dusting resistance and process adhesiveness of the resultant porous membrane can be further improved, and the battery characteristics of the secondary battery including the porous membrane can be further improved.

A presently disclosed porous membrane for a non-aqueous secondary battery is formed using the slurry composition for a non-aqueous secondary battery porous membrane described above. By using the slurry composition described above, a porous membrane that has excellent dusting resistance and process adhesiveness and can improve the battery characteristics of a secondary battery can be formed.

To advantageously solve the problems stated above, a presently disclosed non-aqueous secondary battery comprises the porous membrane for a non-aqueous secondary battery described above. By using the porous membrane described above, a non-aqueous secondary battery with excellent battery characteristics can be obtained.

Advantageous Effect

It is therefore possible to provide a binder composition for a non-aqueous secondary battery porous membrane capable of forming a porous membrane that has excellent dusting resistance and process adhesiveness and can improve the battery characteristics such as high-temperature cycle characteristics and low-temperature output characteristics of a secondary battery.

It is also possible to provide a slurry composition for a non-aqueous secondary battery porous membrane capable of forming a porous membrane that has excellent dusting resistance and process adhesiveness and can improve the battery characteristics of a secondary battery.

It is also possible to provide a porous membrane for a non-aqueous secondary battery that has excellent dusting resistance and process adhesiveness and can improve the battery characteristics of a secondary battery.

It is further possible to provide a non-aqueous secondary battery having excellent battery characteristics such as high-temperature cycle characteristics and low-temperature output characteristics.

DETAILED DESCRIPTION

One of the disclosed embodiments is described in detail below.

A presently disclosed binder composition for a non-aqueous secondary battery porous membrane and slurry composition for a non-aqueous secondary battery porous membrane can be used in the formation of a presently disclosed porous membrane for a non-aqueous secondary battery. The presently disclosed porous membrane for a non-aqueous secondary battery has both porosity and adhesiveness, and so can function not only as a protective layer but also as an adhesive layer for adhesion between battery components. A presently disclosed non-aqueous secondary battery includes the presently disclosed porous membrane for a non-aqueous secondary battery.

(Binder Composition for Non-Aqueous Secondary Battery Porous Membrane)

The presently disclosed binder composition for a non-aqueous secondary battery porous membrane is a binder composition for a non-aqueous secondary battery porous membrane including a polymer and an organic solvent, wherein a boiling point of the organic solvent is 30° C. or more and 100° C. or less, and an absolute difference $|SP_{diff}|=|SP_p-SP_s|$ between a solubility parameter $SP_p$ of the polymer and a solubility parameter $SP_s$ of the organic solvent is 1.5 or more and 6.0 or less.

The reasons why the above-mentioned excellent effects are achieved in the case where the binder composition contains the organic solvent whose boiling point is in the specific temperature range and the polymer whose absolute difference in solubility parameter from the organic solvent is in the specific range are not clear, but are presumed to be as follows.

The inventor first looked at the point that an effective way of improving the adhesiveness of the porous membrane is to localize the polymer, which is an adhesive component in the porous membrane, on the porous membrane surface. The inventor then newly discovered that, by providing an environment in which the polymer precipitates easily in the formation of the porous membrane, the polymer aggregates and precipitates easily in spaces in the porous membrane or on the porous membrane surface. The "ease of precipitation" of the polymer dissolved in the solvent can be defined using the solubility parameter (hereinafter, also referred to as "SP value") of each of the polymer and the solvent. The "solubility parameter" is a value that can be an index for evaluating affinity between substances. If the respective SP values of two substances are close, the affinity between these substances is high. In detail, in the case where one of two substances having approximately equal SP values is a polymer and the other substance is a solvent, the solubility of the polymer in the solvent is high. Through further studies, the inventor newly discovered that, by limiting the absolute difference between the SP values of the polymer and the solvent to a specific range, the precipitation of the polymer can be facilitated in the formation of the porous membrane while ensuring the solubility of the polymer in the solvent. The inventor also discovered that, by selecting a solvent with a boiling point in a specific temperature range as the solvent and combining, with the solvent, such a polymer whose absolute difference in SP value from the solvent is in the specific range, the precipitation of the polymer on the porous membrane surface can be increased. It is thus presumed that the adhesiveness of the porous membrane can be improved by containing, in the presently disclosed binder composition, the organic solvent whose boiling point is in the specific temperature range and the polymer whose absolute difference in solubility parameter from the organic solvent is in the specific range. When the adhesiveness of the porous membrane is high, the dusting resistance and process adhesiveness of the porous membrane are high, with it being possible to improve the battery characteristics of the secondary battery.

<Polymer>

The polymer is a substance that is in a dissolved state in the binder composition and, when removing the solvent in the formation of the porous membrane, precipitates and functions as an adhesive component in the porous membrane before and after immersion in an electrolysis solution.

The polymer contained in the presently disclosed binder composition for a non-aqueous secondary battery porous membrane may be any polymer as long as its difference in SP value from the organic solvent is in the above-mentioned range, but is preferably a polymer containing a nitrile group and a straight chain alkylene structural unit having a carbon number of 4 or more in the same molecule.

[Polymer Containing Nitrile Group and Straight Chain Alkylene Structural Unit Having a Carbon Number of 4 or More in the Same Molecule]

The polymer containing a nitrile group and a straight chain alkylene structural unit having a carbon number of 4 or more in the same molecule contains a nitrile group and a straight chain alkylene structural unit having a carbon number of 4 or more as repeating units, and optionally further contains repeating units (hereinafter, also referred to as "other repeating units") other than these repeating units.

—Nitrile Group—

Examples of nitrile group-containing monomers that can introduce the nitrile group into the polymer include an α,β-ethylenically unsaturated nitrile monomer. The α,β-ethylenically unsaturated nitrile monomer is not specifically limited other than being an α,β-ethylenically unsaturated compound that has a nitrile group, and may for example be acrylonitrile; an α-halogenoacrylonitrile such as α-chloroacrylonitrile or α-bromoacrylonitrile; or an α-alkylacrylonitrile such as methacrylonitrile or α-ethylacrylonitrile. Of these monomers, the nitrile group-containing monomer is preferably acrylonitrile or methacrylonitrile, and is more preferably acrylonitrile. Any one of such nitrile group-containing monomers may be used individually, or any two or more of such nitrile group-containing monomers may be used in combination.

The proportion of the nitrile group in the polymer is preferably 5 mass % or more, more preferably 9 mass % or more, further preferably 10 mass % or more, and particularly preferably 15 mass % or more, and preferably 40 mass % or less, more preferably 30 mass % or less, and further preferably 20 mass % or less. By setting the proportion of the nitrile group in the polymer to not less than the above-mentioned lower limit, the strength of the polymer can be improved, and the adhesiveness of the porous membrane can be further improved. Moreover, degradation of the secondary battery having the porous membrane caused by repeated charging/discharging can be reduced, and the high-temperature cycle characteristics of the secondary battery can be further improved. By setting the proportion of the nitrile group in the polymer to not more than the above-mentioned upper limit, the dusting resistance of the porous membrane can be further improved.

In the case of synthesizing monomers to produce the polymer, the proportion of the nitrile group in the polymer can be set to the desired range by appropriately adjusting the blending amount of the nitrile group-containing monomer unit in the production. For the polymer which has been already produced, the proportion of the nitrile group in the polymer can be measured by gas chromatography or NMR (Nuclear Magnetic Resonance).

—Straight Chain Alkylene Structural Unit Having a Carbon Number of 4 or More—

The straight chain alkylene structural unit having a carbon number of 4 or more is a repeating unit composed only of a straight chain alkylene structure expressed by the general formula: —$C_nH_{2n}$— [where n is an integer of 4 or more]. Since the polymer contains the straight chain alkylene structural unit having a carbon number of 4 or more, it swells to an appropriate degree in the electrolysis solution, as a result of which the battery characteristics can be further improved. In particular, the polymer preferably contains the straight chain alkylene structural unit having a carbon number of 4 or more in a main chain.

Although no specific limitations are placed on the method by which the straight chain alkylene structural unit having a carbon number of 4 or more is introduced into the polymer, the methods described below in (1) and (2) may for example be used:

(1) A method involving preparing a polymer from a monomer composition containing a conjugated diene monomer and hydrogenating the resultant polymer in order to convert the conjugated diene monomer unit to an alkylene structural unit.

(2) A method involving preparing a polymer from a monomer composition containing a 1-olefin monomer.

Of these methods, the method described in (1) is preferable in terms of ease of production of the polymer. In the method described in (1), it is preferable to perform hydrogenation reaction separately in two or more stages. As a catalyst for hydrogenation reaction, a typical catalyst such as palladium acetate may be used in a typical amount.

Examples of the conjugated diene monomer include conjugated diene compounds having a carbon number of 4 or more such as 1,3-butadiene, isoprene, 2,3-dimethyl-1,3-butadiene, 2-ethyl-1,3-butadiene, and 1,3-pentadiene. Of these conjugated diene compounds, 1,3-butadiene is preferable. In other words, the straight chain alkylene structural unit having a carbon number of 4 or more is preferably a structural unit obtained through hydrogenation of a conjugated diene monomer unit (i.e., the alkylene structural unit is preferably a hydrogenated conjugated diene unit), and is more preferably a structural unit obtained through hydrogenation of a 1,3-butadiene unit (i.e., the alkylene structural unit is more preferably a hydrogenated 1,3-butadiene unit).

Examples of the 1-olefin monomer include ethylene, propylene, 1-butene, and 1-hexene.

The conjugated diene monomer or the 1-olefin monomer may be one type used individually, or may be two or more types used in combination.

The proportion of the straight chain alkylene structural unit having a carbon number of 4 or more in the polymer is preferably 45 mass % or more, more preferably 55 mass % or more, and further preferably 60 mass % or more, and preferably 85 mass % or less, more preferably 80 mass % or less, further preferably 75 mass % or less, and particularly preferably 70 mass % or less, where the proportion of all repeating units (total of structural units and monomer units) in the polymer is taken to be 100 mass %.

—Other Repeating Units—

Examples of monomers (hereinafter, also referred to as "other monomers") that can form other repeating units include, but are not limited to, (meth)acrylic acid ester monomers and acid group-containing polymerizable monomers. One of such monomers may be used individually, or two or more of such monomers may be used in combination. In the present disclosure, "(meth)acryl" is used to indicate "acryl" and/or "methacryl".

Examples of (meth)acrylic acid ester monomers include: acrylic acid alkyl esters, such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters, such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

Examples of acid group-containing polymerizable monomers include monomers having a carboxylic acid group, monomers having a sulfonate group, monomers having a phosphate group, and monomers having a hydroxyl group. In terms of enhancing the binding capacity of the polymer, the acid group is preferably a carboxylic acid group or a sulfonate group, and more preferably a carboxylic acid group.

Examples of monomers having a carboxylic acid group include monocarboxylic acids, derivatives of monocarboxylic acids, dicarboxylic acids, acid anhydrides of dicarboxylic acids, and derivatives of dicarboxylic acids.

Examples of monocarboxylic acids include acrylic acid, methacrylic acid, and crotonic acid.

Examples of monocarboxylic acid derivatives include 2-ethylacrylic acid, isocrotonic acid, α-acetoxy acrylic acid, β-trans-aryloxy acrylic acid, α-chloro-β-E-methoxy acrylic acid, and β-diamino acrylic acid.

Examples of dicarboxylic acids include maleic acid, fumaric acid, and itaconic acid.

Examples of derivatives of dicarboxylic acids include methyl maleic acid, dimethyl maleic acid, phenyl maleic acid, chloromaleic acid, dichloromaleic acid, fluoromaleic acid, and maleic acid esters such as methylallyl maleate, diphenyl maleate, nonyl maleate, decyl maleate, dodecyl maleate, octadecyl maleate, and fluoroalkyl maleate.

Examples of acid anhydrides of dicarboxylic acids include maleic anhydride, acrylic acid anhydride, methyl maleic anhydride, and dimethyl maleic anhydride.

Furthermore, an acid anhydride that produces a carboxyl group upon hydrolysis can also be used as a monomer having a carboxylic acid group.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of monomers having a sulfonate group include vinyl sulfonic acid, methyl vinyl sulfonic acid, (meth)allyl sulfonic acid, styrene sulfonic acid, (meth)acrylic acid-2-ethyl sulfonate, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of monomers having a phosphate group include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of monomers having a hydroxyl group include: ethylenic unsaturated alcohol, such as (meth)allyl alcohol, 3-butene-1-ol, and 5-hexene-1-ol; alkanol esters of ethylenic unsaturated carboxylic acid, such as 2-hydroxyethyl-acrylate, 2-hydroxypropyl-acrylate, 2-hydroxyethyl-methacrylate, 2-hydroxypropyl-methacrylate, di-2-hydroxyethyl-maleate, di-4-hydroxybutyl maleate, and di-2-hydroxypropyl itaconate; esters of (meth)acrylic acid and polyalkylene glycol represented by the general formula $CH_2=CR^1-COO-(C_nH_{2n}O)_m-H$ (where m represents an integer from 2 to 9, n represents an integer from 2 to 4, and R1 represents hydrogen or a methyl group); mono(meth)acrylic acid esters of dihydroxy ester of dicarboxylic acid, such as 2-hydroxyethyl-2'-(meth)acryloyl oxyphthalate and 2-hydroxyethyl-2'-(meth)acryloyl oxysuccinate; vinyl ethers, such as 2-hydroxyethyl vinyl ether and 2-hydroxypropyl vinyl ether; mono(meth)allyl ethers of alkylene glycol, such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers, such as diethylene glycol mono(meth)allyl ether and dipropylene glycol mono(meth)allyl ether; glycerin mono(meth)allyl ether; mono(meth)allyl ether of halogen or hydroxy substitution of (poly)alkylene glycol, such as (meth)allyl-2-chloro-3-hydroxypropyl ether and (meth)allyl-2-hydroxy-3-chloropropyl ether; mono(meth)allyl ether of polyhydric phenol, such as eugenol and isoeugenol, and a halogen substitution thereof; and (meth)allyl thioethers of alkylene glycol, such as (meth)allyl-2-hydroxyethyl thioether and (meth)allyl-2-hydroxypropyl thioether.

The proportion of the other repeating units in the polymer is preferably 40 mass % or less.

[Solubility Parameter of Polymer]

The solubility parameter $SP_p$ of the polymer needs to be such that the absolute difference $|SP_{diff}|=SP_p-SP_s|$ between the solubility parameter $SP_p$ of the polymer and the solubility parameter $SP_s$ of the organic solvent is 1.5 or more and 6.0 or less. $|SP_{diff}|$ is preferably 2.0 or more and more preferably 2.5 or more, and preferably 5.0 or less and more preferably 4.5 or less. By setting the value of $|SP_{diff}|$ to not less than the above-mentioned lower limit, excessive dissolution of the polymer in the organic solvent can be suppressed to improve the dusting resistance and process adhesiveness of the porous membrane. By setting the value of $|SP_{diff}|$ to not more than the above-mentioned upper limit, the solubility of the polymer in the organic solvent can be ensured to improve the dusting resistance and process adhesiveness of the porous membrane. With the binder composition having a value of $|SP_{diff}|=|SP_p-SP_s|$ in this range, the cycle characteristics and rate characteristics of the secondary battery can be improved. Normally, it is preferable that the solubility parameter $SP_p$ of the polymer and the solubility parameter $SP_s$ of the organic solvent satisfy $SP_p>SP_s$.

The solubility parameter may be calculated, for example, by a method of estimation from a molecular structure or a method of estimation from a physical property value. Examples of the method of estimation from a molecular structure include the calculation method of Small, the calculation method of Rheineck and Lin, the calculation method of Krevelen and Hoftyzer, the calculation method of Fedors, the calculation method of Hansen, and the calculation method of Hoy. Examples of the method of estimation from a physical property value include a method of calculation from latent heat of vaporization, a method by Hildebrand Rule, a method based on surface tension, a method of calculation from a solubility value, and a method of calculation from a refractive index. The SP value of a substance whose composition or compound name is difficult to be identified may be calculated, for example, by a cloud-point titration method. Of these, the calculation method of Fedors is preferable. In the calculation method of Fedors, the SP value is calculated based on Hildebrand's theory using cohesive energy and molar volume. In detail, when the cohesive energy of each unit included in the polymer is denoted by $E_{coh}$ and the molar volume of each unit is denoted by V, the SP value can be calculated according to the following formula (1):

$$SP=[\Sigma E_{coh}/\Sigma V]^{1/2} \quad (1).$$

For example, acrylonitrile has one secondary carbon (—CH$_2$—) unit, one tertiary carbon (—CH<) unit, and one nitrile group (—CN) unit. The cohesive energy $E_{coh}$ and molar volume V of each of these units are as follows, according to the values proposed by Fedors, —CH$_2$—: $E_{coh}$=4940 J/mol, V=16.1 cm$^3$/mol
—CH<: $E_{coh}$=3430 J/mol, V=−1.0 cm$^3$/mol
—CN: $E_{coh}$=25530 J/mol, V=24.0 cm$^3$/mol.

Calculating these values based on the above formula (1) yields the SP value $SP_{AN}$ of acrylonitrile as $$SP_{AN}=[(4940+3430+25530)/(16.1-1.0+24.0)]^{1/2}=29.4 \text{ (J/cm}^3)^{1/2} \approx 29.4 \text{ MPa}^{1/2}.$$

Meanwhile, straight chain alkylene having a carbon number of 4 has four secondary carbon (—CH$_2$—) units. In the same way as above, the SP value $SP_{alk}$ is calculated as $$SP_{alk}=[(4940\times4)/(16.1\times4)]^{1/2}=17.5 \text{ (J/cm}^3)^{1/2} \approx 17.5 \text{ MPa}^{1/2}.$$

The SP value $SP_p$ of the polymer that is composed of the acrylonitrile monomer-derived acrylonitrile monomer unit and the straight chain alkylene structural unit having a carbon number of 4 and in which the proportion of the acrylonitrile monomer unit is $a_1$ mass % and the proportion of the straight chain alkylene structural unit having a carbon number of 4 is $a_2$ mass % can be calculated according to the following formula (2):

$$SP_p(\text{MPa}^{1/2})=(SP_{AN}\times a_1+SP_{alk}\times a_2)/(a_1+a_2) \quad (2).$$

In the case of newly producing the polymer, the proportion of each monomer unit or structural unit included in the polymer can be calculated based on, for example, the number of parts charged (blending ratio) in the production of the polymer. Alternatively, the polymer may be subjected to, for example, measurement by gas chromatography as described in the EXAMPLES section below, to measure the proportion of each monomer unit or structural unit in the polymer.

The foregoing formula (2) can be generalized for not only polymers composed of the above-mentioned specific monomer units or structural units but also polymers having other monomer units or structural units, as shown in the following formula (3):

$$SP_p(\text{MPa}^{1/2})=(SP_1\times a_1+SP_2\times a_2+\ldots+SP_n\times a_n)/(a_1+a_2+\ldots+a_n) \quad (3)$$

where $SP_1$ is the SP value of a first monomer unit or structural unit in the polymer, $a_1$ is its mass proportion (%) in the polymer, $SP_2$ to $SP_n$ are respectively the SP values of second to nth monomer units or structural units in the polymer, and $a_2$ to $a_n$ are respectively their mass proportions (%) in the polymer.

[Weight-Average Molecular Weight (Mw)]

The weight-average molecular weight of the polymer is preferably 50000 or more, more preferably 60000 or more, further preferably 70000 or more, and particularly preferably 200000 or more, and preferably 500000 or less, more preferably 400000 or less, and further preferably 300000 or less. By setting the weight-average molecular weight of the polymer to not less than the above-mentioned lower limit, excessive dissolution of the polymer in the organic solvent can be suppressed to further improve the process adhesiveness of the porous membrane. By setting the weight-average molecular weight of the polymer to not more than the above-mentioned upper limit, the fluidity of the polymer in the slurry composition including the polymer can be ensured in the formation of the porous membrane. This enables the polymer to aggregate and precipitate on the porous membrane surface, with it being possible to further improve the process adhesiveness of the porous membrane. The molecular weight of the polymer can be controlled in the production of the polymer. For example, the molecular weight can be increased by decreasing the additive amount of a chain transfer agent or the like added in the production of the polymer, and decreased by increasing the additive amount.

[Glass-Transition Temperature]

The glass-transition temperature of the polymer is preferably 20° C. or less, more preferably 0° C. or less, and further preferably −20° C. or less. By limiting the glass-transition temperature of the polymer to this range, the dusting resistance of the porous membrane can be improved.

The glass-transition temperature of the polymer can be measured according to JIS K7121.

[Method of Producing Polymer]

The polymer may be produced through polymerization of a monomer composition containing the above-mentioned monomers in an aqueous solvent such as water. The content proportion of each monomer in the monomer composition can be set in accordance with the content proportion of the corresponding repeating unit (monomer unit/structural unit) in the polymer. No specific limitations are placed on the mode of polymerization and a method such as solution polymerization, suspension polymerization, bulk polymerization, or emulsion polymerization can be used. Examples of types of polymerization reactions that can be used include ionic polymerization, radical polymerization, and living radical polymerization.

The polymerization may be carried out with commonly used additives such as emulsifier, dispersant, polymerization initiator, polymerization aid, chain transfer agent, or the like, and the amount thereof may also be the same as commonly used. The polymerization conditions may be appropriately adjusted in accordance with the polymerization method, the type of polymerization initiator, and the like.

<Organic Solvent>

[Boiling Point of Organic Solvent]

The organic solvent contained in the binder composition for a non-aqueous secondary battery porous membrane needs to have a boiling point of 30° C. or more and 100° C. or less. The boiling point of the organic solvent is preferably 35° C. or more, more preferably 40° C. or more, and further preferably 50° C. or more, and preferably 80° C. or less and more preferably 70° C. or less. By setting the boiling point of the organic solvent to not less than the above-mentioned lower limit, the coatability of the coating solution containing the binder composition is improved, and the dusting resistance of the porous membrane formed using the binder composition is improved. By setting the boiling point of the organic solvent to not more than the above-mentioned upper limit, the drying property when forming the porous membrane using the binder composition is improved. Hence, the polymer moves easily in the porous membrane during drying. This increases the precipitation of the polymer on the porous membrane surface, and thus improves the process adhesiveness of the porous membrane.

[Solubility Parameter of Organic Solvent]

The solubility parameter $SP_s$ of the organic solvent may be any value, as long as the absolute difference from the solubility parameter $SP_p$ of the polymer is in the above-mentioned specific range.

The solubility parameter of the organic solvent can be calculated in the same way as the solubility parameter of the polymer. The solubility parameter is preferably calculated using the calculation method of Fedors.

[Type of Organic Solvent]

Examples of the organic solvent whose boiling point is in the above-mentioned specific numeric range include acetone, methyl ethyl ketone, and tetrahydrofuran, and an appropriate solvent can be selected depending on the solubility parameter $SP_p$ of the polymer. Two or more organic solvents may be used in combination, as long as the boiling point and the absolute difference from the solubility parameter $SP_p$ of the polymer are in the above-mentioned respective specific ranges.

<Additives>

The binder composition for a non-aqueous secondary battery porous membrane may contain other optional components besides the components described above. Commonly known examples of such other components can be used without any specific limitations so long as the battery reactions are not affected. One of such other components may be used individually, or two or more of such other components may be used in combination.

Examples of these other components include known additives such as dispersants, thickeners, and wetting agents.

<Method of Producing Binder Composition for Non-Aqueous Secondary Battery Porous Membrane>

A method of producing the presently disclosed binder composition for a non-aqueous secondary battery porous membrane is a method of producing a binder composition for a non-aqueous secondary battery porous membrane including a polymer and an organic solvent, and includes a step of mixing the polymer and the organic solvent (hereinafter, also referred to as "mixing step"), wherein the boiling point of the organic solvent is 30° C. or more and 100° C. or less, and the absolute difference $|SP_{diff}|=|SP_p-SP_s|$ between the solubility parameter $SP_p$ of the polymer and the solubility parameter $SP_s$ of the organic solvent is 1.5 or more and 6.0 or less. In the mixing step, the polymer, the organic solvent, and optional additives used as necessary may be mixed by a typical mixing method, without particular limitations.

(Slurry Composition for Non-Aqueous Secondary Battery Porous Membrane)

The presently disclosed slurry composition for a non-aqueous secondary battery porous membrane includes the presently disclosed binder composition for a non-aqueous secondary battery porous membrane described above, and non-conductive particles. The presently disclosed slurry composition for a non-aqueous secondary battery porous membrane is capable of forming a porous membrane that has excellent dusting resistance and process adhesiveness and can improve the battery characteristics of the secondary battery.

<Non-Conductive Particles>

The non-conductive particles are particles that maintain their shape without dissolving in a dispersion medium of the slurry composition for a non-aqueous secondary battery porous membrane and a non-aqueous electrolysis solution of a secondary battery. The non-conductive particles are electrochemically stable and are, therefore, present stably in a porous membrane under the usage environment of a secondary battery.

Various types of inorganic fine particles and organic fine particles can for example be used as the non-conductive particles.

Examples of inorganic particles that can be used include: particles of an oxide such as aluminum oxide, silicon oxide, magnesium oxide, titanium oxide, $BaTiO_2$, ZrO, or alumina-silica composite oxide; particles of a nitride such as aluminum nitride or boron nitride; covalent crystal particles such as silicone or diamond particles; low-solubility ionic crystal particles such as barium sulfate, calcium fluoride, or barium fluoride particles; and fine particles of a clay material such as talc or montmorillonite. These particles may be subjected to element substitution, surface treatment, solid solution treatment, and/or the like as necessary. One of such particles may be used individually, or two or more of such particles may be used in combination. Of these, oxide particles are preferable and aluminum oxide is particularly preferable, in terms of stability in an electrolysis solution and potential stability.

The organic particles are not limited as long as they are insoluble in the organic solvent, and any organic particles may be used. As used here, "insoluble" means that when 0.5 g of the organic particles are added to 100 g of the organic solvent at 25° C., 90 mass % or more is insoluble. Here, the organic particles may swell in the organic solvent. Examples of organic particles that can be used include: particles of various crosslinked polymers such as crosslinked polymethyl methacrylate, crosslinked polystyrene, crosslinked polydivinyl benzene, crosslinked styrene-divinyl benzene copolymer, polyimide, polyamide, polyamide imide, melamine resin, phenolic resin, and benzoguanamine-formaldehyde condensate; and particles of heat resistant polymers such as polysulfone, polyacrylonitrile, polyaramid, polyacetal, and thermoplastic polyimide. The organic particles may be their mixtures, modified substances, derivatives, copolymers (random copolymers, alternate copolymers, block copolymers, graft copolymers), and crosslinking substances (in the case of heat resistant polymers). The glass-transition temperature of the organic particles is preferably 25° C. or more.

The surface of a fine powder of a conductive metal or conductive compound or oxide such as carbon black, graphite, $SnO_2$, ITO, or metal powder may be surface-treated with a non-conductive substance to impart electrical insulation and put to use. Two or more of such non-conductive particles may be used in combination.

[Volume-Average Particle Diameter D50 of Non-Conductive Particles]

The volume-average particle diameter D50 of the non-conductive particles used in the present disclosure is preferably 5 nm to 10 μm, more preferably 10 nm to 5 μm, and particularly preferably 100 nm to 2 μm. By limiting the volume-average particle diameter D50 of the non-conductive particles to this range, the below-mentioned control of the dispersion state of the slurry composition is facilitated, which eases the production of a homogeneous porous membrane with a predetermined thickness. Moreover, since an increase in particle filling rate in the porous membrane is suppressed, the conductivity of ions contributing to battery reaction of the porous membrane is prevented from decreasing. Further, the presently disclosed porous membrane can be formed thin. The volume-average particle diameter D50 of the non-conductive particles is particularly preferably in a range of 200 nm to 2 μm, as excellent dispersion, coatability, and space control are achieved.

[Particle Diameter Distribution of Non-Conductive Particles]

The particle diameter distribution (CV value) of the non-conductive particles is preferably 0.5% to 40%, more preferably 0.5% to 30%, and particularly preferably 0.5% to 20%. By limiting the particle diameter distribution of the non-conductive particles to this range, a predetermined space can be secured between the non-conductive particles. This prevents a situation where the movement of ions contributing to battery reaction in the presently disclosed secondary battery is hampered and the resistance increases.

The volume-average particle diameter D50 and the particle diameter distribution may be measured using a laser diffraction particle size analyzer. In particular, the volume-average particle diameter D50 may be calculated as a particle diameter at which, in a particle size distribution (volume basis) of the non-conductive particles measured, the cumulative volume calculated from a small diameter end of the distribution reaches 50%.

<Blending Proportion of Binder Composition>

Regarding the blending proportion of the binder composition in the slurry composition for a non-aqueous secondary battery porous membrane, the proportion of the polymer in the binder composition is preferably 15 parts by mass or more, more preferably 16 parts by mass or more, and further preferably 17 parts by mass or more, and preferably 30 parts by mass or less, more preferably 28 parts by mass or less, and further preferably 26 parts by mass or less, relative to 100 parts by mass of the non-conductive particles. By setting the proportion of the polymer in the slurry composition to not less than the above-mentioned lower limit, the dusting resistance and process adhesiveness of the porous membrane formed using the slurry composition can be further improved. By setting the proportion of the polymer in the slurry composition to not more than the above-mentioned upper limit, the conductivity of ions contributing to battery reaction of the porous membrane formed using the slurry composition can be improved to improve the low-temperature output characteristics of the secondary battery. In addition, degradation of the porous membrane caused by repeated charging/discharging can be reduced, and the high-temperature cycle characteristics of the secondary battery can be further improved.

[Organic Solvent]

The organic solvent of the slurry composition for a non-aqueous secondary battery porous membrane may be the same organic solvent as that usable for the binder composition. In the case of adding the organic solvent in the production of the slurry composition, the same organic solvent as that of the binder composition or an organic solvent different from that of the binder composition may be used. In the case of using an organic solvent different from that of the binder composition, the organic solvent needs to be selected so that the boiling point and the absolute difference from the solubility parameter $SP_p$ of the polymer are in the above-mentioned specific ranges.

[Additives]

The slurry composition for a non-aqueous secondary battery porous membrane may contain the above-mentioned additives that can be contained in the binder composition.

[Method of Producing Slurry Composition for Non-Aqueous Secondary Battery Porous Membrane]

The presently disclosed slurry composition for a non-aqueous secondary battery porous membrane can be obtained by mixing the non-conductive particles, the binder composition, and optional additives used as necessary, without particular limitations.

Although no specific limitations are placed on the mixing method and the mixing order of the above-mentioned components, the mixing is preferably performed using a disperser as a mixing device to efficiently disperse the components. The disperser is preferably a device that can homogeneously disperse and mix the components. Examples of such devices include a media-less disperser, a ball mill, a sand mill, a pigment disperser, a grinding machine, an ultrasonic disperser, a homogenizer, and a planetary mixer.

In particular, in terms of setting the volume-average particle diameter D50 and particle diameter distribution of the non-conductive particles to the above-mentioned desired ranges, it is preferable to mix the non-conductive particles and the organic solvent to yield a pre-dispersion mixed solution, efficiently disperse such a dispersion liquid according to the above-mentioned method, and perform classification using a classifier, to obtain a dispersion liquid of the non-conductive particles. It is preferable to mix the resultant dispersion liquid of the non-conductive particles with the binder composition and the like, to produce the slurry composition. A dispersant such as cyanoethylated pullulan may be used here.

(Porous Membrane for Non-Aqueous Secondary Battery)

The presently disclosed porous membrane for a non-aqueous secondary battery is formed using the slurry composition for a non-aqueous secondary battery porous membrane described above. For example, the presently disclosed porous membrane for a non-aqueous secondary battery may be formed by applying the slurry composition onto the surface of a suitable substrate to form an applied film and then drying the applied film. Thus, the presently disclosed porous membrane for a non-aqueous secondary battery is a dried product of the above-described slurry composition for a non-aqueous secondary battery porous membrane, and contains the polymer and the non-conductive particles. The ratios of the components contained in the presently disclosed porous membrane for a non-aqueous secondary battery are normally the same as the ratios of the components contained in the presently disclosed slurry composition for a porous membrane, and the suitable ratios of the components in the porous membrane for a non-aqueous secondary battery are the same as the suitable ratios of the components in the slurry composition. The presently disclosed porous membrane for a non-aqueous secondary battery has excellent dusting resistance and process adhesiveness, and can improve the battery characteristics of a secondary battery.

<Substrate>

The substrate onto which the slurry composition for a porous membrane is applied is not limited. For example, an applied membrane of the slurry composition for a porous membrane may be formed on a surface of a detachable substrate, the applied membrane may be dried to form a porous membrane, and the detachable substrate may be peeled from the porous membrane. The porous membrane peeled from the detachable substrate as described above can be used in the formation of battery components of a secondary battery as a free-standing membrane. In detail, the porous membrane peeled from the detachable substrate may be stacked on a separator substrate to form a separator including the porous membrane. Alternatively, the porous membrane peeled from the detachable substrate may be stacked on an electrode substrate to form an electrode including the porous membrane.

However, from a viewpoint of omitting a step of peeling the porous membrane and improving the production efficiency of battery components, it is preferable to use a separator substrate or an electrode substrate as the substrate. The porous membrane provided on the separator substrate or electrode substrate can be suitably used as a protective layer for improving the heat resistance, strength, and so forth of the separator or electrode.

[Separator Substrate]

Although no specific limitations are placed on the separator substrate, the separator substrate may for example be a known separator substrate such as an organic separator substrate. Herein, the organic separator substrate is a porous member made from an organic material, and may for example be a fine porous membrane or non-woven fabric including a polyolefin resin such as polyethylene or polypropylene, an aromatic polyamide resin, or the like. A fine porous membrane or non-woven fabric made from polyethylene is preferable due to having excellent strength. Although the thickness of the separator substrate can be freely set, the thickness is preferably 0.5 μm or more and more preferably 5 μm or more, and preferably 40 μm or less, more preferably 30 μm or less, and further preferably 20 μm or less.

[Electrode Substrate]

The electrode substrate (positive/negative electrode substrate) is not specifically limited and may, for example, be an electrode substrate obtained by forming an electrode mixed material layer on a current collector.

Herein, the current collector, an electrode active material (positive/negative electrode active material) in the electrode mixed material layer, and a binder for an electrode mixed material layer (binder for a positive/negative electrode mixed material layer), and the method by which the electrode mixed material layer is formed on the current collector may be known examples thereof such as described, for example, in JP 2013-145763 A.

<Method of Forming Porous Membrane for Secondary Battery>

The method by which the porous membrane is formed on the above-mentioned substrate such as a separator substrate or an electrode substrate may for example be:

1) A method in which the presently disclosed slurry composition for a secondary battery porous membrane is applied onto the surface of a separator substrate or an electrode substrate (a surface at an electrode mixed material layer side in the case of an electrode substrate; the same also applies below) and is then dried;

2) A method in which a separator substrate or an electrode substrate is immersed in the presently disclosed slurry composition for a secondary battery porous membrane and the resultant product is then dried; or 3) A method in which the presently disclosed slurry composition for a secondary battery porous membrane is applied onto a detachable substrate and is dried to produce a porous membrane that is then transferred onto the surface of a separator substrate or an electrode substrate.

Of these methods, the method described in 1) is particularly preferable since it allows the thickness of the porous membrane to be easily controlled. The method described in 1) more specifically includes a step of applying the slurry composition for a porous membrane onto a substrate (application step) and a step of drying the applied slurry composition for a porous membrane on the substrate to form a porous membrane (porous membrane formation step).

[Application Step]

No specific limitations are placed on the method by which the slurry composition for a porous membrane is applied onto the substrate in the application step. For example, a method such as doctor blading, reverse roll coating, direct roll coating, gravure coating, extrusion coating, or brush coating may be used.

[Porous Membrane Formation Step]

The slurry composition for a porous membrane that has been applied onto the substrate may be dried by any commonly known method in the porous membrane formation step without any specific limitations. For example, drying may be carried out through drying by warm, hot, or low-humidity air; drying in a vacuum; or drying by irradiation with infrared light or electron beams. Although no specific limitations are placed on the drying conditions, the drying temperature is preferably 50° C. to 150° C., and the drying time is preferably 5 minutes to 30 minutes.

<Thickness of Porous Membrane>

The thickness of the porous membrane formed on the substrate is preferably 0.01 μm or more, more preferably 0.1 μm or more, and further preferably 1 μm or more, and preferably 20 μm or less, more preferably 10 μm or less, and further preferably 5 μm or less. Sufficient strength of the porous membrane can be ensured through the thickness of the porous membrane being 0.01 μm or more. The diffusibility of the electrolysis solution can be ensured and the output characteristics of the secondary battery can be improved through the thickness of the porous membrane being 20 μm or less.

(Non-Aqueous Secondary Battery)

The presently disclosed non-aqueous secondary battery includes the presently disclosed porous membrane for a non-aqueous secondary battery. Since the presently disclosed non-aqueous secondary battery includes the presently disclosed porous membrane for a non-aqueous secondary battery, it has excellent battery characteristics such as high-temperature cycle characteristics and low-temperature output characteristics. In more detail, the presently disclosed non-aqueous secondary battery includes the presently disclosed porous membrane for a non-aqueous secondary battery, on at least one of a positive electrode, a negative electrode, and a separator or between these battery components and a battery container.

<Positive Electrode, Negative Electrode, and Separator>

An electrode produced by providing the presently disclosed porous membrane on an electrode substrate that is obtained by forming an electrode mixed material layer on a current collector can be used as a porous membrane-containing positive electrode or a porous membrane-containing negative electrode. Moreover, a separator produced by providing the presently disclosed porous membrane on a separator substrate can be used as a porous membrane-containing separator. The electrode substrate and the separator substrate can be any of the examples previously described in the "Porous membrane for non-aqueous secondary battery" section.

A positive electrode, negative electrode, or separator that does not include a porous membrane can be used without any specific limitations. For example, an electrode composed of an electrode substrate such as previously described or a separator composed of a separator substrate such as previously described may be used.

<Electrolysis Solution>

The electrolysis solution is normally an organic electrolysis solution obtained by dissolving a supporting electrolyte in an organic solvent. For example, in a lithium ion secondary battery, the supporting electrolyte is a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferred as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution is not specifically limited so long as the supporting electrolyte can dissolve therein. In the case of a lithium ion secondary battery, suitable examples of the organic solvent include: carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable due to having a high permittivity and a wide stable potential region. Normally, as the viscosity of the solvent being used is lower, the lithium ion conductivity tends to increase. Hence, the conductivity of ions contributing to battery reaction can be adjusted by the type of solvent.

The concentration of the electrolyte in the electrolysis solution can be adjusted as needed. Any additive known in the art may be added to the electrolysis solution, such as vinylene carbonate (VC), fluoroethylene carbonate (FEC), or ethyl methyl sulfone.

(Method of Producing Non-Aqueous Secondary Battery)

The presently disclosed non-aqueous secondary battery described above can for example be produced by overlapping the positive electrode and the negative electrode via the separator, performing rolling, folding, or the like of the resultant product as required to place the resultant product in a battery container, pouring the electrolysis solution into the battery container, and sealing the battery container. At least one of the positive electrode, the negative electrode, and the separator is a porous membrane-equipped member, or at least one porous membrane is located between these battery components and the battery container. An expanded metal, an overcurrent prevention element such as a fuse or a PTC element, a lead plate, or the like may be placed in the battery container as required in order to prevent pressure from increasing inside the battery container and prevent overcharging or overdischarging from occurring. The shape of the battery may for example be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion of a structural unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used in order to measure and evaluate the proportion of the nitrile group in the polymer, the weight-average molecular weight of the polymer, the SP values of the polymer and the organic solvent, the volume-average particle diameter D50 and particle size distribution of the non-conductive particles, the process adhesiveness and dusting resistance of the porous membrane, and the high-temperature cycle characteristics and low-temperature output characteristics of the secondary battery.

<Proportion of Nitrile Group in Polymer>

About 1 mg by solid content equivalents of a polymer after hydrogenation produced in each of the examples and comparative examples was weighed, packed in pyrofoil (produced by Japan Analytical Industry Co. Ltd., F590), and heated at 590° C. for 7 seconds to be gasified. The result was measured using gas chromatography (produced by Shimadzu Corporation, GC-14A). Using TC-1701 (length: 30 m, inner diameter: 0.25 mm, film-thickness: 1.0 μm) produced by GL Sciences Inc. as a column, the measurement was performed at a heating rate of 10° C./minute in a temperature range of 50° C. to 200° C. As a measurement sample, a polymer film obtained by removing moisture from the polymer after hydrogenation was used. Data collection and analysis were conducted using a data processor (produced by Shimadzu Corporation, Chromatopac "C-R4A"). From pyrolysis gas chromatography, the nitrile group-derived peak area was determined, and the proportion of the nitrile group-derived peak area to the total value of the peak areas of the other units that can be contained in the polymer was calculated. The proportion of the nitrile group in the polymer was thus calculated.

When determining the number of parts charged of each monomer in the production of the polymer, the proportion of the nitrile group in the polymer may be estimated from the molecular weight proportion of the nitrile group in each monomer, and the number of parts charged of each monomer may be determined so that the proportion of the nitrile group is a desired value.

<Weight-Average Molecular Weight of Polymer>
(Production of Measurement Sample)

The polymer produced in each of the examples and comparative examples was added to about 5 mL of an eluent so that the solid content concentration of the polymer was about 0.5 g/L, and gradually dissolved at room temperature. After visually confirming the dissolution, filtration was gently performed with a filter (pore size: 0.45 μm), thus producing a measurement sample.

(Measurement Conditions)

The following measurement device was used:

Column: produced by Tosoh Corporation, TSKgel α-M (7.8 mm I.D.×30 cm), two columns Eluent: tetrahydrofuran Flow rate: 0.5 mL/minute Sample concentration: about 0.5 g/L (solid content concentration)

Injection amount: 200 μL

Column temperature: 40° C.

Detector: produced by Tosoh Corporation, RI detector in High Performance GPC System HLC-8320 GPC Detector condition: RI: Pol(+), Res(1.0 s)

Molecular weight marker: produced by Tosoh Corporation, Standard Polystyrene Kit PStQuick Kit-H.

<Glass-Transition Temperature (Tg) of Polymer>

The polymer produced in each of the examples and comparative examples was used as a measurement sample. The measurement sample was weighed into an aluminum pan in an amount of 10 mg and a differential scanning calorimeter (produced by SII Technology, product name: EXSTAR DSC6220) was used to measure a DSC curve with respect to the measurement sample under normal temperature and humidity with a measurement temperature range of −100° C. to 500° C. and a heating rate of 10° C./minute, and using an empty aluminum pan as a reference. The glass transition temperature (Tg [° C.]) of the polymer was determined from an intersection point of a base line directly before a heat absorption peak on the DSC curve at which a derivative signal (DDSC) was at least 0.05 mW/minute/mg in a heating process and a tangent to the DSC curve at a first inflection point to appear after the heat absorption peak.

<SP Values of Polymer and Organic Solvent>

The SP values of the polymer produced in each of the examples and comparative examples and the organic solvent used in each of the examples and comparative examples were calculated based on the above-mentioned calculation method of Fedors. The calculation method of Fedors is as described above. Regarding the cohesive energy and molar volume of each unit contained in the polymer/organic solvent, Robert F. Fedors, "A method for estimating both the solubility parameters and molar volumes of liquids", Polymer Engineering and Science, February 1974, Vol. 14, No. 2, pp. 147 to 154 was referenced.

In particular, the SP value of the polymer was calculated based on the foregoing formula (3):

$$SP_p(MPa^{1/2}) = (SP_1 \times a_1 + SP_2 \times a_2 + \ldots + SP_n \times a_n)/(a_1 + a_2 + \ldots + a_n) \quad (3)$$

where $SP_1$ is the SP value of a first monomer unit or structural unit in the polymer, $a_1$ is its mass proportion (%) in the polymer, $SP_2$ to $SP_n$ are respectively the SP values of second to nth monomer units or structural units in the polymer, and $a_2$ to $a_n$ are respectively their mass proportions (%) in the polymer. The values of $SP_1$ to $SP_n$ were calculated according to the calculation method of Fedors. Moreover, $a_1$ to $a_n$ were calculated based on the charging amounts of the respective monomers and the like.

<Volume-Average Particle Diameter D50 and Particle Diameter Distribution of Non-Conductive Particles>

The particle diameter distribution of the non-conductive particles was measured using a laser diffraction particle diameter distribution measurement device (produced by Shimadzu Corporation, SALD-3100). The volume-average particle diameter D50 of the non-conductive particles was taken to be a particle diameter at which, in the particle diameter distribution, the cumulative volume calculated from a small diameter end of the distribution reached 50%.

<Process Adhesiveness of Porous Membrane>

Regarding Examples 1 to 11, Comparative Examples 1 to 3

A laminate including a positive electrode and a separator and a laminate including a negative electrode and a separator produced in each of the examples and comparative examples were each cut out to 10 mm in width to obtain a specimen. The specimen was pressed with conditions of 120° C., 0.35 MPa, and 8 seconds, to yield an integrated product integrating the electrode and the separator. Thereafter, the integrated product was positioned with the surface of the electrode (positive electrode or negative electrode) underneath and cellophane tape was attached to the surface of the electrode. Tape prescribed by JIS Z1522 was used as the cellophane tape. The cellophane tape was fixed to a horizontal test bed. One end of the separator was pulled vertically upward at a pulling speed of 50 mm/minute to peel off the separator and the stress during this pulling was measured. The measurement described above was carried out three times for laminates that each included a positive electrode and a separator and three times for laminates that each included a negative electrode and a separator to give a total of six measurements, and an average value for the stress was determined as the peel strength. A higher peel strength indicates higher adhesiveness between battery components. In other words, a higher peel strength indicates higher adhesiveness before immersion in an electrolysis solution in the secondary battery production process, i.e. higher process adhesiveness.

A: peel strength of 2.0 N/m or more
B: peel strength of 1.0 N/m or more and less than 2.0 N/m
C: peel strength of 0.6 N/m or more and less than 1.0 N/m
D: peel strength of less than 0.6 N/m.

Regarding Examples 12 and 13

The same measurement and evaluation as above were performed on a laminate including a positive electrode and a separator in Example 12 and a laminate including a negative electrode and a separator in Example 13.

<Dusting Resistance of Porous Membrane>

A separator having a porous membrane produced in each of Examples 1 to 11 and Comparative Examples 1 to 3, a positive electrode having a porous membrane produced in Example 12, and a negative electrode having a porous membrane produced in Example 13 were each cut to 5 cm square to obtain a specimen, and its mass $X_0$ was measured. The specimen was put in a 500 ml glass bottle, and shaken for 3 hours at 100 oscillations/min using a shaker (produced by Tokyo Rikakikai Co, Ltd., Shaker (multi-shaker) MMS-110). After this, the mass $X_1$ of the shaken specimen was measured. The proportion (X mass %) of the mass decrease due to the shaking from the mass before the shaking was calculated according to the following formula, and evaluated based on the following criteria. A lower proportion X indicates a smaller amount of dusting by the shaking, and thus indicates higher dusting resistance.

$$X[\text{mass \%}]=(X_0-X_1)/X_0\times100.$$

A: less than 1 mass %
B: 1 mass % or more and less than 3 mass %
C: 3 mass % or more and less than 5 mass %
D: 5 mass % or more.

<High-Temperature Cycle Characteristics of Secondary Battery>

A wound cell lithium ion secondary battery of 800 mAh produced in each of the examples and comparative examples was left for 24 hours at an ambient temperature of 25° C. Thereafter, a charge/discharge operation in which charging was performed to 4.35 V at 0.1 C and discharging was performed to 2.75 V at 0.1 C was carried out at an ambient temperature of 25° C. The initial capacity $C_0$ in this operation was measured. Charging and discharging were further performed repeatedly for 1000 cycles at an ambient temperature of 60° C. with the same conditions, and the capacity $C_1$ after 1000 cycles was measured.

The capacity maintenance rate $\Delta C$ was calculated according to $\Delta C=C_1/C_0\times100(\%)$. A higher capacity maintenance rate $\Delta C$ indicates higher high-temperature cycle characteristics of the secondary battery and longer battery life of the secondary battery.

A: $\Delta C$ of 84% or more
B: $\Delta C$ of 80% or more and less than 84%
C: $\Delta C$ of less than 80%.

<Low-Temperature Output Characteristics of Secondary Battery>

A wound cell lithium ion secondary battery of 800 mAh produced in each of the examples and comparative examples was left for 24 hours at an ambient temperature of 25° C. Thereafter, a charging operation was performed for 5 hours at a charging rate of 0.1 C and an ambient temperature of 25° C., and the voltage $V_0$ in this operation was measured. Thereafter, a discharging operation was performed at a discharging rate of 1 C and an ambient temperature of −10° C., and the voltage $V_1$ 15 seconds after the start of discharging was measured. The voltage change $\Delta V$ was calculated according to $\Delta V=V_0-V_1$. A smaller voltage change $\Delta V$ indicates better low-temperature characteristics of the secondary battery.

A: $\Delta V$ of less than 350 mV
B: $\Delta V$ of 350 mV or more.

Example 1

<Production of Polymer>

An autoclave equipped with a stirrer was charged with, in the stated order, 240 parts of deionized water, 2.5 parts of sodium alkylbenzene sulfonate as an emulsifier, 36.2 parts of acrylonitrile as a nitrile group-containing monomer, and 0.45 parts of t-dodecylmercaptan as a chain transfer agent. After the inside had been purged with nitrogen, 63.8 parts of 1,3-butadiene as a conjugated diene monomer for introducing a straight chain alkylene structural unit having a carbon number of 4 or more into a polymer was added under pressure, and 0.25 parts of ammonium persulfate was added as a polymerization initiator. A polymerization reaction was carried out at a reaction temperature of 40° C., to yield a copolymer of acrylonitrile and 1,3-butadiene. The polymerization conversion rate was 85%.

Deionized water was added to the obtained polymer to prepare a solution having a total solid content concentration of 12 mass %. 400 mL (total solid content 48 g) of this solution was loaded into a 1 L autoclave equipped with a stirrer. Nitrogen gas was caused to flow for 10 minutes in order to remove oxygen dissolved in the solution. Thereafter, 75 mg of palladium acetate used as a hydrogenation reaction catalyst was dissolved in 180 mL of deionized water to which nitric acid had been added in an amount of four molar equivalents of the palladium (Pd), and the resultant solution was added into the autoclave. After purging the system twice with hydrogen gas, the contents of the autoclave were heated to 50° C. in a state in which the hydrogen gas pressure was raised to 3 MPa, and a hydrogenation reaction (first stage hydrogenation reaction) was carried out for 6 hours.

Next, the autoclave was returned to atmospheric pressure. In addition, 25 mg of palladium acetate used as a hydrogenation reaction catalyst was dissolved in 60 mL of deionized water to which nitric acid had been added in an amount of four molar equivalents of the Pd, and the resultant solution was added into the autoclave. After purging the system twice with hydrogen gas, the contents of the autoclave were heated to 50° C. in a state in which the hydrogen gas pressure was raised to 3 MPa, and a hydrogenation reaction (second stage hydrogenation reaction) was carried out for 6 hours.

Next, the contents of the autoclave were returned to room temperature and the system was changed to a nitrogen atmosphere. Thereafter, concentrating was performed using an evaporator until a solid content concentration of 40% was reached to thereby yield a water dispersion of the polymer.

The water dispersion of the polymer was added dropwise to methanol to coagulate, and then the coagulated material was vacuum dried at a temperature of 60° C. for 12 hours, to obtain a polymer.

<Production of Binder Composition>

The obtained polymer was mixed with acetone as an organic solvent, to obtain a binder composition including a polymer containing a straight chain alkylene structural unit (hydrogenated 1,3-butadiene unit) having a carbon number of 4 and a nitrile group-containing monomer unit (acrylonitrile unit).

<Production of Slurry Composition>

Prior to the production of a slurry composition, a pre-dispersion mixed solution of non-conductive particles was prepared as follows. As the non-conductive particles, 100 parts of a alumina particles (produced by Nippon Light Metal Co., Ltd., LS-256, primary particle size: 0.85 μm, primary particle diameter distribution: 10%) produced by the Bayer process and 0.5 parts by mass of cyanoethylated pullulan (cyanoethylation substitution rate: 80%) as a dispersant were mixed. Acetone as an organic solvent was added to the mixture so that the solid content concentration was 25%, to obtain the pre-dispersion mixed solution of the non-conductive particles.

The pre-dispersion mixed solution of the non-conductive particles obtained in this way was dispersed in a single pass under conditions of a circumferential velocity of 10 m/second and a flow rate of 200 L/hour, using a media-less disperser (produced by IKA, In-Line Crusher MKO). After this, classification was performed using a classifier (produced by ACO Co. Ltd., Slurry Screener), to obtain a dispersion liquid of the non-conductive particles. The volume-average particle diameter D50 of the non-conductive particles in the obtained dispersion liquid of the non-conductive particles was 0.9 μm, and the particle diameter distribution of the non-conductive particles was 13%.

<Production of Slurry Composition for Non-Aqueous Secondary Battery Porous Membrane>

The binder composition and the dispersion liquid of the non-conductive particles were mixed in an agitated vessel so that the blending amount of the polymer in the binder composition per 100 parts by mass of the non-conductive particles was 20 parts by mass. The mixture was diluted with acetone as an organic solvent, to obtain a slurry composition for a porous membrane with a solid content concentration of 20%.

<Formation of Porous Membrane for Non-Aqueous Secondary Battery>

The slurry composition for a porous membrane obtained in this way was applied onto a polypropylene separator (produced by Celgard, LLC., Celgard 2500) and was dried for 3 minutes at 50° C. This operation was carried out on both sides of the separator, to obtain a separator including a porous membrane with a thickness of 3 μm per side.

The process adhesiveness and separator dusting property of the obtained separator including the porous membrane were evaluated according to the above-mentioned method. The results are shown in Table 1.

<Production of Negative Electrode>

A 5 MPa pressure vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. The contents of the pressure vessel were sufficiently stirred and were then heated to 50° C. to initiate polymerization. The reaction was terminated by cooling at the point at which the polymerization conversion rate reached 96%, to yield a mixture containing a particulate binder (SBR). The mixture containing the particulate binder was adjusted to pH 8 through addition of 5% sodium hydroxide aqueous solution. Thereafter, unreacted monomers were removed from the mixture by heated vacuum distillation. Cooling was subsequently performed to 30° C. or less, to obtain a water dispersion containing a negative electrode binder as a particulate polymer.

100 parts of artificial graphite (average particle diameter: 15.6 μm), 1 part by solid content equivalents of a 2% aqueous solution of a carboxymethyl cellulose sodium salt (produced by Nippon Paper Industries Co., Ltd., MAC350HC) as a thickener, and deionized water were mixed so that the solid content concentration was adjusted to 68%, and were then further mixed for 60 minutes at 25° C. Next, deionized water was used to adjust the solid content concentration to 62% and further mixing was performed for 15 minutes at 25° C. Thereafter, the water dispersion containing the negative electrode binder was added to the mixed solution so that the negative electrode binder was 1.5 parts by mass by solid content equivalents, and deionized water was added to adjust the final solid content concentration to 52%, and further mixing was performed for 10 minutes. The resultant mixed liquid was subjected to a defoaming process under reduced pressure, to yield a slurry composition for a secondary battery negative electrode having good fluidity.

A comma coater was used to apply the slurry composition for a negative electrode obtained as described above onto copper foil of 20 μm in thickness, used as a current collector, such as to have a thickness of approximately 150 μm after drying. The applied slurry composition was dried by conveying the copper foil inside a 60° C. oven for 2 minutes at a speed of 0.5 m/minute. Thereafter, heat treatment was performed for 2 minutes at 120° C. to obtain a pre-pressing negative electrode web. The pre-pressing negative electrode web was rolled by roll pressing, to obtain a post-pressing negative electrode including a negative electrode active material layer of 80 μm in thickness (one-side negative electrode).

<Production of Positive Electrode>

A slurry composition for a positive electrode was prepared by using a planetary mixer to mix 100 parts of $LiCoO_2$ with a volume-average particle diameter of 12 μm as a positive electrode active material, 2 parts of acetylene black (produced by Denki Kagaku Kogyo Kabushiki Kaisha, HS-100) as a conductive material, 2 parts by solid content equivalents of PVDF (produced by Kureha Corporation, #7208) as a binder, and NMP so as to have a total solid content concentration of 70%.

A comma coater was used to apply the slurry composition for a positive electrode onto aluminum foil of 20 μm in thickness, used as a current collector, so as to have a thickness of approximately 150 μm after drying. The applied slurry composition was dried by conveying the aluminum foil inside a 60° C. oven for 2 minutes at a speed of 0.5 m/minute. Thereafter, heat treatment was performed for 2 minutes at 120° C., to obtain a pre-pressing positive electrode web. The pre-pressing positive electrode web was rolled by roll pressing, to obtain a post-pressing positive electrode including a positive electrode active material layer of 80 μm in thickness (one-side positive electrode).

<Production of Lithium Ion Secondary Battery>

The post-pressing positive electrode obtained as described above was cut out to a length of 49 cm and a width of 5 cm, and the separator cut out to a length of 120 cm and a width 5.5 cm was arranged thereon. Moreover, the post-pressing negative electrode obtained as described above was cut out to a square of a length of 50 cm and a width of 5.2 cm, and arranged on the separator so that the surface on the negative electrode active material layer side faced the separator. The product was then wound by a winding machine to obtain a wound product. An adhesive layer surface was located on the outermost periphery of the wound product. The wound product was pressed with conditions of 120° C., 0.35 MPa, and 8 seconds, to obtain a flat product. The flat product was packed in an aluminum packing case used as a battery case. The aluminum packing case was filled with an electrolysis solution (solvent: ethylene carbonate (EC)/diethyl carbonate (DEC)/vinylene carbonate (VC) (volume ratio)=68.5/30/1.5, electrolyte: $LiPF_6$ of 1M in concentration) so that no air remained. The aluminum case was then closed by heat sealing at 150° C. to tightly seal an opening of the aluminum packing. Further, the wound product and the aluminum packing part as a case were pressed with conditions of 100° C., 1.0 MPa, and 2 minutes. In this manner, a wound lithium ion secondary battery of 800 mAh was produced.

The high-temperature cycle characteristics and low-temperature output characteristics of the produced wound lithium ion secondary battery were evaluated in the above-mentioned manner. The results are shown in Table 1.

Examples 2 to 5

Each measurement and evaluation were performed in the same way as in Example 1, except that the blending amount of each monomer in the production of the polymer was changed as shown in Table 1. The results are shown in Table 1.

Examples 6 and 7

Each measurement and evaluation were performed in the same way as in Example 1, except that the organic solvent was changed as shown in Table 1. The results are shown in Table 1.

Examples 8 and 9

Each measurement and evaluation were performed in the same way as in Example 1, except that the content of t-dodecylmercaptan as a chain transfer agent added in the production of the polymer was changed to 0.3 parts (Example 8) or 0.6 parts (Example 9). The results are shown in Table 1.

Examples 10 and 11

Each measurement and evaluation were performed in the same way as in Example 1, except that the blending amount of the binder composition was changed so that the blending amount of the polymer relative to 100 parts by mass of the non-conductive particles was as shown in Table 1 in the production of the slurry composition. The results are shown in Table 1.

Examples 12 and 13

A slurry composition was produced in the same way as in Example 1. Then, a lithium ion secondary battery was produced in the same way as in Example 1, except that, in the production of the lithium ion secondary battery, a separator substrate was used by itself as a separator without forming a porous membrane, and a positive electrode having a porous membrane (Example 12) or a negative electrode having a porous membrane (Example 13) was used as a positive electrode (Example 12) or a negative electrode (Example 13). Each measurement and evaluation were performed according to the above-mentioned methods. The results are shown in Table 1.

<Production of Negative Electrode/Positive Electrode Including Porous Membrane>

As in Example 1, a negative electrode/positive electrode mixed material layer with a thickness of 80 μm was formed on a current collector, to obtain an electrode substrate. A slurry composition was then applied to the surface on the negative electrode/positive electrode mixed material layer side, and dried at 50° C. for 3 minutes. A negative electrode/positive electrode including a porous membrane with a thickness of 3 μm on one side was thus produced.

Comparative Examples 1 and 3

Each measurement and evaluation were performed in the same way as in Example 1, except that the blending amount of each monomer in the production of the polymer contained in the binder composition was changed as shown in Table 1. The results are shown in Table 1.

Comparative Example 2

Each measurement and evaluation were performed in the same way as in Example 1, except that the organic solvent was changed to N-methylpyrrolidone. The results are shown in Table 1.

In Table 1, "AN" denotes acrylonitrile, "BD" denotes 1,3-butadiene, "BA" denotes butylacrylate, "MEK" denotes methyl ethyl ketone, "THF" denotes tetrahydrofuran, and "NMP" denotes N-methylpyrrolidone.

TABLE 1

| | | | | Example 1 | Example 2 | Example 3 | Example 4 | Example 5 | Example 6 | Example 7 | Example 8 | Example 9 |
|---|---|---|---|---|---|---|---|---|---|---|---|---|
| Slurry composition for porous membrane | Binder composition for porous membrane | Polymer | Nitrile group content proportion [mass %] | 17.4 | 10.3 | 9.1 | 23.9 | 15.3 | 17.4 | 17.4 | 17.4 | 17.4 |
| | | | Nitrile group-containing monomer Type | AN | AN | AN | AN | AN | AN | AN | AN | AN |
| | | | Nitrile group-containing monomer Blending amount [parts by mass] | 36.2 | 22 | 19.5 | 50 | 36.2 | 36.2 | 36.2 | 36.2 | 36.2 |
| | | | Conjugated diene monomer Type | BD | BD | BD | BD | BD | BD | BD | BD | BD |
| | | | Conjugated diene monomer Blending amount [parts by mass] | 63.8 | 78 | 80.5 | 50 | 54.8 | 63.8 | 63.8 | 63.8 | 63.8 |
| | | | Other monomer Type | — | — | — | — | BA | — | — | — | — |
| | | | Other monomer Blending amount [parts by mass] | — | — | — | — | 9 | — | — | — | — |
| | | | Solubility parameter $SP_p$ [MPa$^{1/2}$] | 22.4 | 20.6 | 20.3 | 23.9 | 23.6 | 22.4 | 22.4 | 22.4 | 22.4 |
| | | | Glass-transition temperature Tg [°C] | −35 | −45 | −50 | −20 | −35 | −35 | −35 | −35 | −35 |
| | | | Weight-average molecular weight (Mw) [−] | 250000 | 250000 | 250000 | 250000 | 250000 | 250000 | 250000 | 380000 | 55000 |
| | | Organic solvent | Type | Acetone | Acetone | Acetone | Acetone | Acetone | MEK | THF | Acetone | Acetone |
| | | | Boiling point [°C] | 56 | 56 | 56 | 56 | 56 | 76 | 66 | 56 | 56 |
| | | | Solubility parameter $SP_s$ [MPa$^{1/2}$] | 18.5 | 18.5 | 18.5 | 18.5 | 18.5 | 18.3 | 18.9 | 18.5 | 18.5 |
| | | SP value absolute difference [−] | | 3.9 | 2.1 | 1.8 | 5.4 | 5.1 | 4.1 | 3.5 | 3.9 | 3.9 |
| | | Non-conductive particles | Type | Alumina | Alumina | Alumina | Alumina | Alumina | Alumina | Alumina | Alumina | Alumina |
| | | | Blending amount [parts by mass] | 100 | 100 | 100 | 100 | 100 | 100 | 100 | 100 | 100 |
| Porous membrane formation portion | | | Polymer blending amount [parts by mass] | 20 | 20 | 20 | 20 | 20 | 20 | 20 | 20 | 20 |
| | | | | Separator | Separator | Separator | Separator | Separator | Separator | Separator | Separator | Separator |
| Evaluation | | | Process adhesiveness of porous membrane | A | B | C | B | B | B | B | B | C |
| | | | Dusting resistance of porous membrane | A | B | B | B | B | A | A | A | A |
| | | | High-temperature cycle characteristics of secondary battery | A | A | A | A | A | A | A | A | A |
| | | | Low-temperature output characteristics of secondary battery | A | A | A | A | A | A | A | A | A |

| | | | | Example 10 | Example 11 | Example 12 | Example 13 | Comparative Example 1 | Comparative Example 2 | Comparative Example 3 |
|---|---|---|---|---|---|---|---|---|---|---|
| Slurry composition for porous membrane | Binder composition for porous membrane | Polymer | Nitrile group content proportion [mass %] | 17.4 | 17.4 | 17.4 | 17.4 | 5.6 | 17.4 | 42 |
| | | | Nitrile group-containing monomer Type | AN | AN | AN | AN | AN | AN | AN |
| | | | Blending amount [parts by mass] | 36.2 | 36.2 | 36.2 | 36.2 | 12 | 36.2 | 87 |
| | | | Conjugated diene monomer Type | BD | BD | BD | BD | BD | BD | BD |
| | | | Blending amount [parts by mass] | 63.8 | 63.8 | 63.8 | 63.8 | 88 | 63.8 | 13 |
| | | | Other monomer Type | — | — | — | — | — | — | — |
| | | | Blending amount [parts by mass] | — | — | — | — | — | — | — |

TABLE 1-continued

| | | | | | | | | |
|---|---|---|---|---|---|---|---|---|
| | Solubility parameter SP$_p$ [MPa$^{1/2}$] | 22.4 | 22.4 | 22.4 | 22.4 | 19.2 | 22.9 | 28.1 |
| | Glass-transition temperature Tg [° C.] | −35 | −35 | −35 | −35 | −60 | −35 | 85 |
| | Weight-average molecular weight (Mw) [−] | 250000 | 250000 | 250000 | 250000 | 250000 | 250000 | 250000 |
| Organic solvent | Boiling point [° C.] | 56 | 56 | 56 | 56 | 56 | 203 | 56 |
| | Type | Acetone | Acetone | Acetone | Acetone | Acetone | NMP | Acetone |
| | Solubility parameter SP$_s$ [MPa$^{1/2}$] | 18.5 | 18.5 | 18.5 | 18.5 | 18.5 | 24 | 18.5 |
| SP value absolute difference [−] | | 3.9 | 3.9 | 3.9 | 3.9 | 0.7 | 1.1 | 9.6 |
| Non-conductive particles | Type | Alumina | Alumina | Alumina | Alumina | Alumina | Alumina | Alumina |
| | Blending amount [parts by mass] | 100 | 100 | 100 | 100 | 100 | 100 | 100 |
| Polymer blending amount [parts by mass] | | 15 | 27 | 20 | 20 | 20 | 20 | 20 |
| Porous membrane formation portion | | Separator | Separator | Positive electrode | Negative electrode | Separator | Separator | Separator |
| Evaluation | Process adhesiveness of porous membrane | C | A | A | A | D | D | C |
| | Dusting resistance of porous membrane | B | A | A | A | D | D | D |
| | High-temperature cycle characteristics of secondary battery | A | B | A | A | C | B | B |
| | Low-temperature output characteristics of secondary battery | A | B | A | A | B | B | B |

As can be understood from Examples 1 to 13 in Table 1, a porous membrane formed using a slurry composition that includes a polymer and an organic solvent with a boiling point of 30° C. or more and 100° C. or less and in which the absolute difference $|SP_{diff}|=|SP_p-SP_s|$ between the solubility parameter $SP_p$ of the polymer and the solubility parameter $SP_s$ of the organic solvent is 1.5 or more and 6.0 or less has excellent dusting resistance and process adhesiveness. Moreover, a secondary battery including such a porous membrane has excellent battery characteristics such as high-temperature cycle characteristics and low-temperature output characteristics.

INDUSTRIAL APPLICABILITY

It is thus possible to obtain a binder composition for a non-aqueous secondary battery porous membrane and a slurry composition for a non-aqueous secondary battery porous membrane capable of forming a porous membrane that has excellent dusting resistance and process adhesiveness and can improve the battery characteristics such as high-temperature cycle characteristics and low-temperature output characteristics of a secondary battery.

It is also possible to obtain a porous membrane for a non-aqueous secondary battery that has excellent dusting resistance and process adhesiveness and can improve the battery characteristics of a secondary battery.

It is further possible to obtain a non-aqueous secondary battery having excellent battery characteristics such as high-temperature cycle characteristics and low-temperature output characteristics.

The invention claimed is:

1. A slurry composition for a non-aqueous secondary battery porous membrane, comprising:
    a binder composition for a non-aqueous secondary battery porous membrane comprising:
        a polymer; and
        an organic solvent,
        wherein a boiling point of the organic solvent is 30° C. or more and 100° C. or less, and
        an absolute difference $|SP_{diff}|=|SP_p-SP_s|$ between a solubility parameter $SP_p$ of the polymer and a solubility parameter $SP_s$ of the organic solvent is 1.5 or more and 6.0 or less; and
    non-conductive particles satisfying coefficient of variation value of 0.5% to 40%;
    wherein a content proportion of the polymer is 15 parts by mass or more and 30 parts by mass or less relative to 100 parts by mass of the non-conductive particles.

2. A porous membrane for a non-aqueous secondary battery formed of a dried product of the slurry composition for a non-aqueous secondary battery porous membrane according to claim 1.

3. A non-aqueous secondary battery, comprising the porous membrane for a non-aqueous secondary battery according to claim 2.

4. The slurry composition for a non-aqueous secondary battery porous membrane according to claim 1, wherein the polymer contains a nitrile group and a straight chain alkylene structural unit having a carbon number of 4 or more, in a same molecule.

5. The slurry composition for a non-aqueous secondary battery porous membrane according to claim 1, wherein a content proportion of a nitrile group in the polymer is 5 mass % or more and 40 mass % or less.

6. The slurry composition for a non-aqueous secondary battery porous membrane according to claim 1, wherein a weight-average molecular weight of the polymer is 50,000 or more and 500,000 or less.

7. The slurry composition for a non-aqueous secondary battery porous membrane according to claim 1, wherein the organic solvent is acetone.

* * * * *